Aug. 12, 1930. E. G. GAGE 1,772,541
HIGH CURRENT FILTER
Filed July 13, 1927  2 Sheets-Sheet 1

Edward G. Gage INVENTOR.
BY
Thomas Howe ATTORNEY.

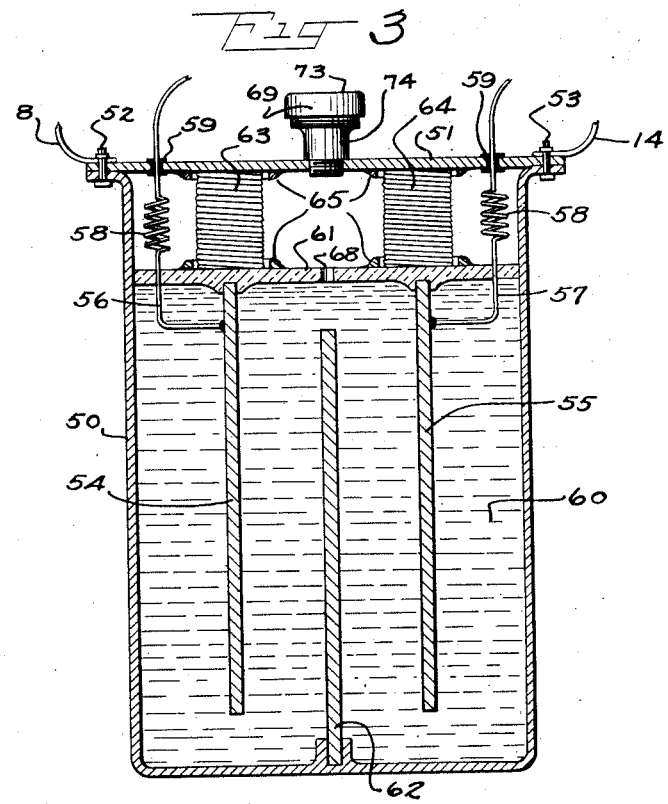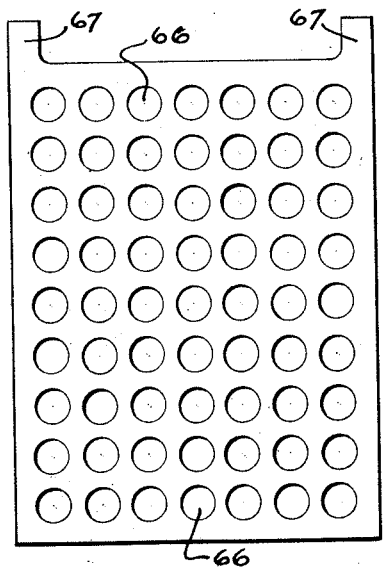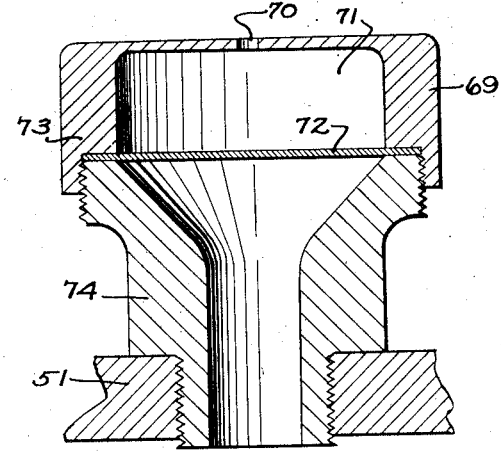

Patented Aug. 12, 1930

1,772,541

UNITED STATES PATENT OFFICE

EDWARD G. GAGE, OF BROOKLYN, NEW YORK, ASSIGNOR TO RADIO PATENTS CORPORATION, OF NEW YORK, N. Y.

HIGH-CURRENT FILTER

Application filed July 13, 1927. Serial No. 205,401.

This invention relates to methods of filtering fluctuating currents of high current values to obtain a smooth and uniform direct current of high value. In particular, it relates to apparatus for supplying current to vacuum tubes, such as used in radio apparatus which require for their operation a particularly stable current, free from fluctuations. Such apparatus is usually most conveniently operated from ordinary alternating current house-wiring circuits, which afford a convenient and common source of supply.

In my United States applications for high current filter, Serial No. 629,292, filed April 2, 1923, and systems of supplying current to vacuum tubes, Serial No. 704,966, filed April 8, 1924, I have described forms of such apparatus in detail.

In these applications, rectifiers, small storage batteries, suitable choke coils, and shock-preventing devices are used to filter the alternating current to a degree suitable for operating vacuum tubes.

Either lead-acid batteries or nickel-iron alkaline, or other suitable batteries may be employed in the device.

The main object of the present invention is to so construct and arrange the battery branches in the filters of my applications above referred to that current flow through those branches will be greatly reduced, if not eliminated. This permits of the practical substitution of dry cells (which may be primary cells) for the liquid storage batteries contemplated in the above referred to applications, although the invention is useful in connection with liquid storage batteries and in fact with all suitable kinds of storage and primary batteries, both liquid and dry.

I have found that storage batteries when used in a filter circuit require that a considerable current flow through them at all times to keep them fully charged. If this is not done they soon fall below their maximum voltage, and unless a very light load only is run from the filter, they soon discharge themselves, and the apparatus becomes noisy or "hums." One way of preventing this is to cause the batteries to be greatly overcharged by an excess voltage from the rectifier circuit, and to keep the impedance comparatively low between sections, so that the different battery sections of the filter receive approximately the same amount of current.

This method has its objections, however, in that the size of the cells is limited and also the size of the chokes. If the choke is made very large in order to reduce the size of the cells, the resistance drop will prevent the second battery from receiving a full charge, and at the same time the first battery will be greatly overcharged and gassing may be dangerous. This is particularly true if the Edison type of battery is used in the filter, employing plates of nickel and iron in a solution of sodium hydrate. This may be overcome by causing the second battery to have a fewer number of cells than the first, and consequently a lower counter electro-motive force, as shown in my U. S. application, Serial No. 704,966, filed April 8, 1924, on system for supplying current to vacuum tubes. When this is done, the impedance may be increased between sections and smaller cells used, and with full wave rectification, the currents passing into and out of the battery sections, which may be termed displacement currents, may be kept small, with a consequent reduction in cell size and chemical activity.

In early attempts to reduce the storage battery mentioned in my first U. S. application, Serial No. 629,292, to a "dry" form, I found very practical difficulties in providing a paste or jelly that would not froth or foam due to the high current necessary to keep the cells fully charged. When such paste or jelly was made sufficiently stiff it was of too high resistance to be suitable. I am aware that it is old to provide storage batteries with "jelly" electrolytes, but I have not found such batteries suitable for filter batteries.

In the patent to Heising, U. S., No. 1,613,949, is shown a form of filter employing standard dry cells as filter batteries with adjustable resistances between sections for carefully balancing the input and output voltages of the cells, as it is of the utmost importance that such cells have extremely small displacement currents; otherwise they will soon exhaust themselves. I have found great difficulty in maintaining this balance. The slightest change in line voltage or cell resistance will upset the balance to a dangerous degree and the increase of even a few mil amperes in displacement current will tremendously shorten the life of the battery. Unlike a storage battery, they must not receive a current sufficient to keep them fully charged, but must float on the line, the ideal condition for dry cells of the Leclanché type being when the line voltage and the normal voltage of the cell is exactly equal. As an example of the difficulty of maintaining such a balance, I have found that a change in line voltage sufficient to increase the direct current component flowing into the cells to 5 mil amperes will shorten the life of the cells over 100 per cent, and a change in the load of 10 per cent (such as for detector adjustment) will increase or decrease the displacement currents more than 10 per cent plus or minus. Such delicate balancing I have found to be impractical.

In an endeavor to provide a more elastic cell, or one with wider limits of voltage, I have experimented with the so-called "Tab" cell, as manufactured by the Dry Storage Battery Company of Philadelphia, which has an excess of zinc chloride, tending to keep moist longer, and a greater electrode spacing. I have found, however, that such cells are of too high resistance, and have a tendency to froth immediately on overcharge. I have overcome this difficulty in the manner to be described, thereby maintaining the "dry" feature of the filter which is desirable for the apparatus but not practical when storage batteries requiring constant charging are used, for reasons previously mentioned.

It is well understood that if the "dry" form of Leclanché cell could be exactly floated on the line, its life in the filter apparatus would approximate its shelf life. The shelf life of even a small-sized standard dry cell of reputable manufacture is about one year so that it becomes apparent that such cells would be satisfactory for filter batteries if they could be made to last even half that time, since they are cheap to renew and easy to obtain in the market, and have every advantage as to cleanliness and freedom from disagreeable features.

By this invention I am enabled to cause such dry cells to last almost their shelf life in a high current filter, thereby making their use practical in such apparatus. To prevent current from the line from going into the filter battery more than momentarily, and to prevent current from the battery discharging into the load more than momentarily, I place, in series with each battery section, an element which may for convenience be called a "filter regulator." The function of this regulator is to create a counter-electromotive-force exactly equal to the forces opposing it, independent of the direction of these forces. In other words, the exact counter-electromotive-force is supplied to prevent current from flowing into or out of the filter batteries more than momentarily and consequently destroying them.

It is well known that certain types of primary batteries are reversible, that is, they are capable of being charged to a certain degree from an external source, and they are capable of delivering current resulting not alone from the chemical action of the agents in the cell according to their order in the electro-chemical series, but in proportion to the separation and re-union of some of the elements within the cell due to electrolysis caused by the charging current. An example of such a reversible cell is the well-known "Edison Leland" primary battery containing electrodes of copper oxide and zinc, in a solution of sodium hydroxide. Another type of reversible cell is the Planté cell, consisting of two sheets of plain lead in a solution of sulfuric acid. Such a cell is used in my original high current filter, previously mentioned, not for its reversible features in this case but because of its ruggedness and low internal resistance.

I have found that two Edison alkaline cells having electrodes of sheet nickel and sheet iron immersed in a solution of sodium hydroxide, when oppositely connected in series, that is, "bucking" each other, are also reversible.

In this case, upon the application of an external source of current, one of the cells becomes entirely discharged, while the other becomes overcharged. The discharged cell then begins to reverse itself. I have also found that two simple iron plates in a solution of sodium hydroxide possess this reversing feature in that it makes no difference which plate is made positive or which negative, for discharging or charging purposes. Another combination which I have found suitable for the purpose and having advantages of rapid reversibility, is an alloy of steel and nickel or nickel-steel for both plates of the cell in a solution of sodium hydroxide. The function of such a cell is not to be confused with the well-known "end cell" operation of storage cells, which have no exhaustible primary source of electro-motive-force, such as the dry cells of the filter previously mentioned, to safeguard.

I have found it important that the cells have as low internal resistance as possible, preferably equal to that of the dry cells in series, with which they are placed. It is also important that the cells have a small storage capacity for this low resistance, also that the connecting leads have separate input and output paths as specified in my previous application.

Referring now to the accompanying drawings,—

Fig. 3 represents in detail this construction of my filter regulator;

Fig. 4 represents one of the perforated plate electrodes of the filter regulator cell; and Fig. 5 represents a detail of the flexible diaphragm gas pressure release.

Figure 1:
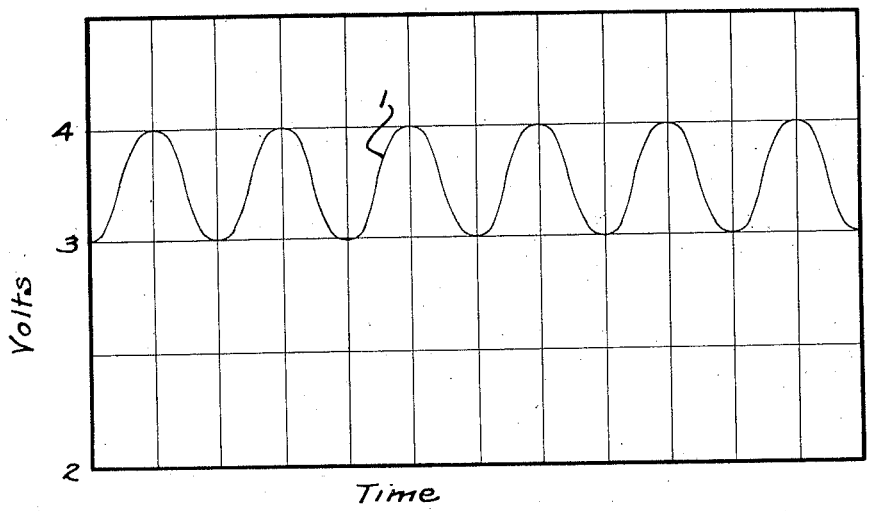
Fig. 1 represents the graph of a partially smoothed current, such as supplied from a rectifier through smoothing impedances using full wave rectification.

In Fig. 1 the curve 1 represents the voltage crests and troughs of the rectified, partially smoothed current from a double wave rectifier and choke. These are a comparatively small proportion of the constant voltage, that is to say, the distance 3—4 is small compared to the distance 2—3. The portion 3—4 represents the voltage wave form of the remaining fluctuations after having been smoothed out by the effect of impedances alone, and the portion 3 represents the maximum constant voltage direct-current line and point 2 the zero line.

In high current filters I have found it to be important to keep the distance 3—4 as small as possible with relation to 2—3, since 3—4 represents the value of displacement currents which the batteries will be called upon to withstand. Consequently, the greater the difference between these two values, the smaller the battery which may be used and the fewer regulator cells required. The action of the filter regulator for displacement currents is quite distinct from its action as a regulator of line and load voltages.

The currents which the entire group of batteries in each section are called upon to function as a filtering device, by offering them a low impedance path, may be considered to reside between the points 3—4 in Fig. 1. The currents which the regulator cell is called upon to control may be considered as residing anywhere between 2 and 4, Fig. 1, depending upon input and output voltages.

From this it may be seen that the work done by the batteries as filters is determined almost exclusively by the extremes of 3—4, Fig. 1, and the reason why these extremes should be kept small by first adding inertia to the current in the form of inductance, becomes apparent.

The action of the filter regulator cell with respect to balancing requirements may now be described.

The circuit discloses the ordinary form of filter in which the "regulator" cell 5 is connected in the filter which feeds one or more of the very sensitive vacuum tubes 6, detector, or otherwise. The battery section 9 having terminals 7 and 8 is composed of dry cells 10 and the portion 11 of the "regulator." The battery section 12 having terminals 13 and 14 is composed of dry cells 15 and the portion 16 of the "regulator." If desired the regulator 5 may be in the form of two separate cells but for mechanical reasons it has been found advantageous to use a single double cell as shown, and to be described still further in detail. Meters 17 and 18 may also be inserted in series with the cells to indicate the proper operation of the filter if desired.

The sections 9 and 12 are fed with alternating current from the supply 19 through the variable reactance 20 and controlling switch contacts 21, and through the primary 22 of transformer 23, preferably a step-down transformer. The secondary 23 is connected to the rectifiers 24 and 25, about which may be shunted the condensers 26 and 27 if they are of the "Tungar" or "Raytheon" gaseous tube type, in order to prevent shock excitation of the system. If a cuprous oxide, tantalum, or colloidal silver, rectifier is used it can be so proportioned as to have the required capacity formed between its electrodes for the prevention of shock excitation. The minimum capacity is about .2 mfds. The center tap 28 of the transformer is connected to the lower return from the filter and the common rectifier connection 30 is connected to the upper return.

As can be seen the filter is in the form of two separate stages 9 and 12. More stages or battery sections can be readily added as is obvious. Between each consecutive section there is arranged, in one or both returns, the impedances 32 and 33, respectively. Additional switch contacts 34, 35, 36 and 37 are located in the positions indicated to prevent change in condition of the filter when the load is withdrawn. A common operator 39 with handle 40 and movable contacts, properly arranged for simultaneous operation is provided.

A second resistor 41 is connected in shunt with the load and arranged on the common control 42 of the resistance 20 in such a way that with an increase of current through the resistor 41 there will be an increase of current through the resistance 20. These two resistances are so designed that they vary according to a predetermined ratio. As an example, if the control 44 be moved ten degrees and the resistor 41 increased thereby to such an extent that the load is decreased by two watts, then the resistor 20 attached to the same control will increase to decrease the input by two watts. A second resistance 43 may also be arranged in the load circuit in series with the tubes 6, for independent adjustment. Such a variable resistance may be also inserted in the filament circuit of each vacuum tube of the system.

Assuming that the regulator cell 5 chosen consists of steel plates in sodium hydrate, this cell when fully charged will deliver approximately one volt. The required smooth current voltage for the operation of the vacuum tubes 6 may be six volts. At the terminals 7—8 of the first battery section 9, Fig. 2, with the load 6 connected, approximately six volts counter-electro-motive force will be required to balance the line. Accordingly four dry cells 11 yielding 1.5 volts each or six volts total, are selected for the constant counter-electromotive force. This, when placed in series with section 11 of the regulator cell 5 mentioned, yields a total counter-electro-motive force of seven volts which, if constant, would soon cause the dry cells to discharge through the load simultaneously with the regulator cell until one or the other was exhausted or a balance reached.

What actually happens, however, is that a few seconds after being connected in circuit (depending on the charge-discharge rate of the regulator cell), this portion 11 of the cell becomes discharged until its voltage is nearly zero and a balance is reached, the dry cells 10 meanwhile holding up their voltage and having a tendency to charge this cell in the reverse direction from the line. Should the load now increase, or the line voltage drop, the regulator portion will discharge further until, if the change be sufficient, it will hover around zero in a discharged state, and if still greater change be made in the same direction, it will start to build up a reverse voltage to that of the dry cell voltage of six volts, continuing to build this up as the change is increased until fully charged to one volt in the reverse direction, a perfect balance being maintained throughout the change from seven volts to five volts. When the change in line or load exceeds these limits a constant flow of current will be indicated on the meter and another regulator cell would have to be inserted or a dry cell withdrawn. However, in practice but one regulator cell is required because any line subject to such enormous fluctuations of voltage would be useless for commercial purposes and any change in load of a radio set is easily kept within the above limits by proper occasional regulation of the knob 44 of the resistance controller.

Instead of an increase in load or drop in line voltage the opposite change, a decrease in load or rise in line voltage will cause the regulator cell to function in a manner which will now be described. Should the load decrease or line rise until the terminal voltage for the filter batteries was, say seven volts, instead of six volts, current from the line would immediately reverse the regulator portion 11 and build up its voltage to one volt. This, in addition to the voltage of the dry cells six volts would effect the required balance, and any change within these limits would also, by the action of the regulator cell portion 11, maintain the balance.

The time required for automatically effecting this balance should be made small by reducing the storage capacity of the regulator cell. In practice milli-ammeters 17 and 18 in series with the regulator cell portions when properly proportioned will swing suddenly to a maximum reading when a change in either line voltage or load is made, and will immediately start to drop back to zero, completing the swing to maximum and back to zero in about five seconds. During this interval of five seconds, both sections of dry cells 7 and 13 and filter regulator cell portions 11 and 16 are very active, depending of course upon the extent of line drop or change of load. The cell should be of sufficient size so that this time lag should not be shorter than the period of the lowest audible tone when used with radio tubes.

When using plain lead plates in sulfuric acid instead of steel plates in sodium hydroxide for the filter regulator, the general action is the same as before described, except that the maximum voltage for the lead-acid cell is two volts instead of one volt, and the reversing line is slightly longer.

Instead of dry cells as the low impedance path in the filter, small storage cells may be used if desired, either of the liquid or so-called dry or paste type, but if they are so employed it is essential that they be made of much greater storage capacity, as an example, about ten times greater than the storing capacity of the filter regulator cells, and they should preferably be fully charged before being placed in circuit.

When storage cells are used in this manner, the filter regulator cells are worked much harder than with dry cells, owing to the constant charging and discharging. Dry cells of course are subject to a certain extent to this as it is well known that a Leclanché dry cell acts slightly as a storage cell when a current is connected to it in opposition, having a voltage in excess of the cell, but the dry cell always possesses a voltage of its own, determined by its position in the electro-chemical series, which the true storage battery lacks, and with which it must constantly be supplied. It is, among other things, to overcome the difficulty of supplying this current with its excessive gassing and large liquid content and difficult regulation that my present invention is intended.

Figure 2:
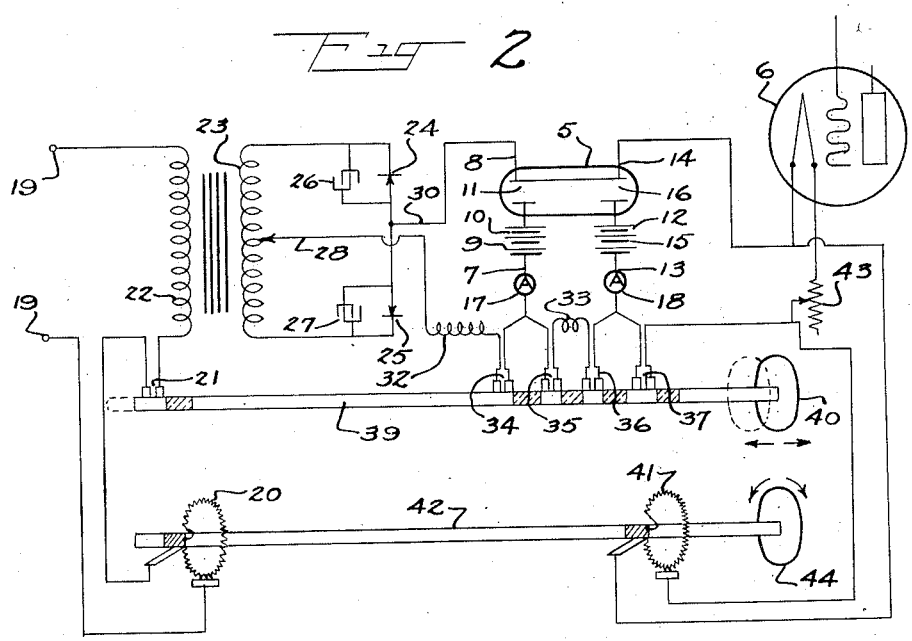
Fig. 2 represents the circuit employed with my improved high current filter apparatus.

To comply with the requirements of a dry battery filter using Leclanché dry cells, it is preferable to provide the filter regulator cells with some sort of paste as the electrolyte. This requirement necessitates the use of some substance which will not deteriorate in the electrolyte. One form of such a cell as I have used is shown in Fig. 3 with a casing 50 composed of steel having cover 51 riveted or bolted thereon by fasteners 52 and 53, also, incidentally, serving as terminals for the two common case connections 8 and 14, as shown in Fig. 2.

The separate plates 54 and 55 are maintained in the electrolyte 60 by means of an insulating piece 61. An extra center plate 62 may be provided to give additional surface area to the electrode container 50. They are connected by wires 56 and 57 having coiled sections 58 through insulators 59.

In case a paste or other absorbent material is used to contain the electrolyte 60 the piece 61 may be in the form of a plunger, unattached to the side walls of the case 50 and with slight clearance. It may then be resiliently compressed against the absorbent material to maintain good contacts by coil springs 63 and 64, properly retained in place by lugs 65.

The plates 54 and 55 as well as certain plates 62, may be formed with holes 66 and supporting legs 67, as shown in Fig. 4, if desired.

A vent, or vent holes 68 and 69 may be arranged to permit equalization of the gases to a certain extent. To facilitate this action and also retain the casing in a fluid tight condition the vent 69 is arranged with 70 and chamber 71 in which is located the resilient diaphragm 72 of rubber, parchment or other tissue. This diaphragm may freely expand or contract, depending upon the pressure thereby modifying the pressure on the sides of the case. It may be so arranged that the vent 70 will have sharpened edges so that if too much pressure is built up the diaphragm 72 will be cut thereby acting as a safety valve. In such a case the cap 73 may be easily unscrewed and a new diaphragm inserted. The base portion 74 of the vent is shown as screwed into the cover 51 of the casing 50.

For the steel plates in sodium hydroxide I have found a satisfactory paste in a saponified solution of sodium hydroxide. The substance resembles soft soap or, if made stiff, is about the consistency of peanut butter. I find a good grade of oil soap satisfactory. An animal fat soap may also be used. In all cases an excess of alkali is present.

I prepare the mixture as follows:

To one part by weight of sodium hydroxide crystals, four to five parts of soft soap are added, the mixture being rapidly stirred, a few spoonfuls of water being added meanwhile. Great heat will be developed during the process but will gradually subside. When the sodium hydroxide has been dissolved and thoroughly mixed with the soap it is poured or packed into a steel container which acts as one of the electrodes of the filter regulator cell, as shown in Fig. 3.

This cell is really two cells in one, having a common electrode for one terminal of each of the cells, the other being an independent electrode.

I find that this construction simplifies the manufacture of the cell and is a better moisture retainer than two separate cells. The internal electrodes, it will be seen, are perforated to allow the paste to freely circulate. As is commonly done with batteries of all sorts, the ohmic resistance is kept low by proximity of the positive and negative electrodes in each cell.

A convenient size of the double cell is 2 x 4 x 4" with perforated electrodes of approximately 32 sq. inches surface.

After the electrodes have been placed in the container and spaced apart as shown in Fig. 3, the interior is packed with the electrolyte paste and the cover with spring plunger to keep the paste tightly packed between electrodes is secured or preferably soldered to the container, causing it to be gas and liquid tight.

A vent is attached to this cover and having a soft rubber diaphragm, which expands when the gas pressure within the container momentarily exceeds atmospheric pressure. If desired, the soft soap may be omitted and a liquid solution of sodium hydroxide used with a covering of paraffine oil as is commonly employed for alkaline storage cells.

Since gassing is prevented by the counter-electromotive force of the dry cells the regulator cell may safely be hermetically sealed with the expanding rubber diaphragm. Thus the liquid feature of such a cell becomes non-objectionable, since it cannot spill or cause corrosion.

Switches having a common control connect the input and output circuits of the batteries so that both are connected or disconnected simultaneously, as shown in my previous application, system of supplying current to vacuum tubes, Serial No. 704,966, applied for April 8, 1924.

When a large variation of load or power supply takes place, such as in changing of the number of tubes used, or in changing the radio set in which the tubes are used from one place to another, having a considerably different voltage, the resistor control knob 44 may be adjusted to correct this difference so that the regulators will not be called upon to produce a greater voltage than they are capable of producing.

Such a switching and control system prevents exhaustion of the batteries in case the power only was turned off, or overcharging of the cells in case the load only was turned off, and other slight variations.

The system may be operated with remote control relays, if desired.

It is desirable that a rectifier having non-shock exciting properties be employed in conjunction with the system if a vacuum tube is to be supplied with current. Such recti fiers and the method of rendering them non-shocking is described in my pending application, Serial No. 704,966, system of supplying current to vacuum tubes, filed April 8, 1924.

Where the rectifier has a sharp cut-off, as is the case with gaseous rectifiers, the sudden start and stop of the rectified current acts like a miniature transmitter of the impact type, so that regardless of the perfection of the filter itself, there is always a residual hum in the output unless means are taken to prevent this. With such rectifiers the current does not start until the resistance of the rectifier has been overcome when there is a sudden rush of current. Similarly, when the alternating current recedes, there is a sharp cut-off at the point where the voltage can no longer overcome the resistance of the rectifier. It is this shocking action which creates a non-filterable hum, and the remedy is a condenser of proper capacity directly in shunt to the rectifier. This condenser builds up a back voltage which joins the incoming current and causes a much more sloping charging curve. It also retains a residual charge and tends to prolong the discharge so that a more sloping cut-off curve is produced.

Instead of the artificial capacity, rectifiers having an inherent capacity, such as the so-called "dry electrolytic" or cuprous oxide rectifier, or the colloidal rectifiers such as the lead aluminum elements in a colloidal solution known as the "colloid" rectifier, or the rectifier having colloidal silver in paste form between metallic electrodes, may be used.

It will be seen that by the means described, I am able to overcome the most serious and troublesome drawbacks of battery filters, i. e., the matter of keeping the batteries always at full voltage without gassing, slopping of liquids, or impractical deterioration of cells.

While the elements herein described are related to a particular system, it will be understood that many variations may be employed without departing from the scope of the appended claims.

I claim:

1. In a system for filtering out current variations, the combination with a filter having main conductors and interconnecting sections, a changeable source of supply connected to the ends of said conductors and a variable load connected to the other ends, a source of potential less variable than said changeable source in each of said sections and means responsive to change in current flow for compensating for the effect of variations of said source and load on said source of less variable potential.

2. In a system for filtering out current variations, the combination with a filter having main conductors and interconnecting sections, a changeable source of supply connected to the ends of said conductors and a variable load connected to the other ends, a source of potential less variable than said changeable source in each of said sections and means for automatically compensating for the effect of variations of said source and load on said source of less variable potential consisting of reversible storage means.

3. In a system for filtering out current variations, the combination with a filter having main conductors and interconnecting sections, a changeable source of supply connected to the ends of said conductors and a variable load connected to the other ends, a source of potential less variable than said changeable source in each of said sections and means for automatically compensating for the effect of variations of said source and load on said source of less variable potential, consisting of small capacity storage means.

4. In a system for filtering out current variations, the combination with a filter having main conductors and interconnecting sections, a changeable source of supply connected to the ends of said conductors and a variable load connected to the other ends, a source of potential less variable than said changeable source in each of said sections and means for automatically compensating for the effect of variations of said source and load on said source of less variable potential consisting of a device in which the flow of direct current therethrough causes an increase of counter-electromotive force.

5. In a system for filtering out current variations, the combination with a filter having main conductors and interconnecting sections, a changeable source of supply connected to the ends of said conductors and a variable load connected to the other ends, a source of potential less variable than said changeable source in each of said sections and means for automatically compensating for the effect of variations of said source and load on said source of less variable potential consisting of a device in which the flow of direct current therethrough causes an increase of counter-electromotive force within a time which is greater than that required by a period of the lowest audible tone and said load consisting of an audio-frequency responsive apparatus.

6. In a system for filtering out current variations, the combination with a filter having main conductors and interconnecting sections, a changeable source of supply connected to the ends of said conductors and a variable load connected to the other ends, a source of potential less variable than said changeable source in each of said sections and means for automatically compensating for the effect of variations of said source and load on said source of less variable potential, and means for simultaneously adjusting said load and source.

7. In a system for filtering out current variations, the combination with a filter having main conductors and interconnecting sections, a changeable source of supply connected to the ends of said conductors and a variable load connected to the other ends, a source of potential less variable than said changeable source in each of said sections and means for automatically compensating for the effect of variations of said source and load on said source of less variable potential, and means for simultaneously disconnecting the load, source and sections from the returns.

8. In a system for filtering out current variations, the combination of a large capacity source of invariable potential and a small capacity source of variable potential, so connected as to protect said large capacity source from destructive currents.

9. In a system from filtering out current variations, the combination of a large capacity source of invariable potential and a small capacity source of variable potential connected in series therewith.

10. In a system for filtering out current variations the method of floating dry cells on a variable potential line which consists in connecting in series therewith an automatically compensating source of electro-motive-force.

In testimony whereof I have signed this specification this 12th day of July, 1927.

EDWARD G. GAGE.